United States Patent

Cole et al.

[11] Patent Number: 5,956,971
[45] Date of Patent: Sep. 28, 1999

[54] PROCESS FOR LIQUEFYING A NATURAL GAS STREAM CONTAINING AT LEAST ONE FREEZABLE COMPONENT

[75] Inventors: Eric T. Cole, Kingwood; Eugene R. Thomas, Houston; Ronald R. Bowen, Magnolia, all of Tex.

[73] Assignee: Exxon Production Research Company, Houston, Tex.

[21] Appl. No.: 09/105,845

[22] Filed: Jun. 26, 1998

Related U.S. Application Data

[60] Provisional application No. 60/051,460, Jul. 1, 1997, and provisional application No. 60/087,677, Jun. 2, 1998.

[51] Int. Cl.$^6$ ....................................................... F25J 3/00
[52] U.S. Cl. .................................. 62/623; 62/631; 62/929
[58] Field of Search ................................ 62/623, 631, 929

[56] References Cited

U.S. PATENT DOCUMENTS

| | | | |
|---|---|---|---|
| 3,298,805 | 1/1967 | Secord et al. | 48/190 |
| 3,477,509 | 11/1969 | Arendt | 166/252 |
| 4,157,904 | 6/1979 | Campbell et al. | 62/27 |
| 4,278,457 | 7/1981 | Campbell et al. | 62/24 |
| 4,284,423 | 8/1981 | Eakman et al. | 62/28 |
| 4,315,407 | 2/1982 | Creed et al. | 62/53 |
| 4,370,156 | 1/1983 | Goddin, Jr. et al. | 62/17 |
| 4,383,842 | 5/1983 | O'Brien | 62/20 |
| 4,449,994 | 5/1984 | Hegarty et al. | 62/17 |
| 4,451,274 | 5/1984 | O'Brien | 62/17 |
| 4,462,814 | 7/1984 | Holmes et al. | 62/17 |
| 4,533,372 | 8/1985 | Valencia et al. | 62/12 |
| 4,608,068 | 8/1986 | Bauer et al. | 62/623 |
| 4,617,039 | 10/1986 | Buck | 62/26 |
| 4,861,360 | 8/1989 | Apffel | 62/17 |
| 4,869,740 | 9/1989 | Campbell et al. | 62/24 |

(List continued on next page.)

FOREIGN PATENT DOCUMENTS 2221977  2/1990  United Kingdom .

OTHER PUBLICATIONS

Donald J. Victory and Jaime A. Valencia, "The CFZ Process: Direct Methane—Carbon Dioxide Fractionation", 66th Annual Gas Processors Association Convention, Denver, Colorado, Mar. 16–18, 1987.

J. M. Ryan and F. W. Schaffert, "Treating Acid & Sour Gas: $CO_2$ Recovery by the Ryan/Holmes Process", *Chemical Engineering Progress* pp. 53–56, Oct. 1984.

Robert D. Denton and D. D. Rule, "Integrated Low Temperature Processing of Sour Natural Gas", 64th Annual Gas Processors Association Convention pp. 92–96 (1985).

R. C. Haut, R. D. Denton and E. R. Thomas, "Development and Application of the Controlled–Freeze–Zone Process", *Society of Petroleum Engineers Production Engineering*, pp. 265–271, Aug. 1989.

(List continued on next page.)

*Primary Examiner*—Ronald Capossela
*Attorney, Agent, or Firm*—G. D. Lawson

[57] ABSTRACT

This invention relates to a process for producing pressurized liquid rich in methane from a multi-component feed stream containing methane and a freezable component having a relative volatility less than that of methane. The multi-component feed stream is introduced into a separation system having a freezing section operating at a pressure above about 1,380 kPa (200 psia) and under solids forming conditions for the freezable component and a distillation section positioned below the freezing section. The separation system produces a vapor stream rich in methane and a liquid stream rich in the freezable component. At least a portion of the vapor stream is cooled to produce a liquefied stream rich in methane having a temperature above about −112° C. (−170° F.) and a pressure sufficient for the liquid product to be at or below its bubble point. A first portion of the liquefied stream is returned to the separation system to provide refrigeration to the separation system. A second portion of the liquefied stream is withdrawn as a pressurized liquefied product stream rich in methane having a temperature above about −112° C. (−170° F.).

30 Claims, 3 Drawing Sheets

U.S. PATENT DOCUMENTS

| | | | |
|---|---|---|---|
| 4,923,493 | 5/1990 | Valencia et al. | 62/13 |
| 5,062,270 | 11/1991 | Haut et al. | 62/12 |
| 5,120,338 | 6/1992 | Potts, Jr. et al. | 62/12 |
| 5,157,925 | 10/1992 | Denton et al. | 62/11 |
| 5,199,266 | 4/1993 | Johansen | 62/8 |
| 5,265,428 | 11/1993 | Valencia et al. | 62/36 |
| 5,555,748 | 9/1996 | Campbell et al. | 62/621 |
| 5,566,554 | 10/1996 | Vijayaraghavan et al. | 62/621 |
| 5,568,737 | 10/1996 | Campbell et al. | 62/621 |
| 5,588,306 | 12/1996 | Schmidt | 62/623 |
| 5,644,931 | 7/1997 | Ueno et al. | 62/612 |

OTHER PUBLICATIONS

R. C. Haut, R. D. Denton and E. R. Thomas, "Development and Application of the Controlled Freeze Zone Process", 7th Offshore South East Asia Conference, Singapore, Feb. 2–5, 1988.

R. C. Haut, R. D. Denton and E. R. Thomas, "Development and Application of the Controlled Freeze Zone Process", SPE–17757, Society of Petroleum Engineers Gas Technology Symposium, Dallas, Texas, pp. 435–443, Jun. 13–15, 1988.

E. R. Thomas and R. D. Denton, "Conceptual Studies for $CO_2$/Natural Gas Separation Using the Controlled Freeze Zone (CFZ) Process", *Gas Separation & Purification*, vol. 2, pp. 84–89, Jun. 1988.

E. R. Thomas and R. D. Denton, "Conceptual Studies Using the Controlled Freeze Zone (CFZ) Process", AIChE Summer National Meeting, Minneapolis, Minnesota, Aug. 16–19, 1987.

C. P. Bennett, "Marine Transportation of LNG at Intermediate Temperature", CME, pp. 63–64, Mar. 1979.

Roger J. Broeker, "CNG and MLG—New Natural Gas Transportation Processes", American Gas Journal, pp. 138–140, Jul. 1969.

Edward K. M. Faridany, Roger C. Ffooks, and Robin B. Meikle, "A Pressure LNG System", European Offshore Petroleum Conference & Exhibition, pp. 245–254, Oct. 1980.

E. K. Faridany, H. C. Secord, J. V. O'Brien, J. F. Pritchard, and M. Banister, "The Ocean Phoenix Pressure–LNG System", pp. 267–280.

E. Fluggen and Ing. H. Backhaus, "Pressurised LNG—and the Utilisation of Small Gas Fields", GasTech78, LNG/LPG Conference, MonteCarlo, pp. 195–204, Nov. 1978.

R. J. Broeker, "A New Process for the Transportation of Natural Gas", Proceedings of the First International Conference of LNG, pp. 1–11, Apr. 1968.

PROCESS FOR LIQUEFYING A NATURAL GAS STREAM CONTAINING AT LEAST ONE FREEZABLE COMPONENT

This application claims the benefit of (i) U.S. Provisional Application No. 60/051,460, filed July 1, 1997; and (ii) U.S. Provisional Application No. 60/087,677, filed Jun. 2, 1998.

FIELD OF THE INVENTION

This invention relates to a natural gas liquefaction process, and more particularly relates to a process to produce pressurized liquid natural gas (PLNG) from a natural gas stream containing at least one freezable component.

BACKGROUND OF THE INVENTION

Because of its clean burning qualities and convenience, natural gas has become widely used in recent years. Many sources of natural gas are located in remote areas, great distances from any commercial markets for the gas. Sometimes a pipeline is available for transporting produced natural gas to a commercial market. When pipeline transportation is not feasible, produced natural gas is often processed into liquefied natural gas (which is called "LNG") for transport to market.

One of the distinguishing features of a LNG plant is the large capital investment required for the plant. The equipment used to liquefy natural gas is generally quite expensive. The liquefaction plant is made up of several basic systems, including gas treatment to remove impurities, liquefaction, refrigeration, power facilities, and storage and ship loading facilities. While the cost of LNG plant can vary widely depending upon plant location, a typical conventional LNG project can cost from U.S. $5 billion to U.S. $10 billion, including field development costs. The plant's refrigeration systems can account for up to 30 percent of the cost.

LNG refrigeration systems are expensive because so much refrigeration is needed to liquefy natural gas. A typical natural gas stream enters a LNG plant at pressures from about 4,830 kPa (700 psia) to about 7,600 kPa (1,100 psia) and temperatures from about 20° C. to about 40° C. Natural gas, which is predominantly methane, cannot be liquefied by simply increasing the pressure, as is the case with heavier hydrocarbons used for energy purposes. The critical temperature of methane is −82.5° C. This means that methane can only be liquefied below that temperature regardless of the pressure applied. Since natural gas is a mixture of gases, it liquefies over a range of temperatures. The critical temperature of natural gas is between about −85° C. and −62° C. Typically, natural gas compositions at atmospheric pressure will liquefy in the temperature range between about −165° C. and −155° C. Since refrigeration equipment represents such a significant part of the LNG facility cost, considerable effort has been made to reduce refrigeration costs.

Many systems exist in the prior art for the liquefaction of natural gas by sequentially passing the gas at an elevated pressure through a plurality of cooling stages whereupon the gas is cooled to successively lower temperatures until the gas liquefies. Conventional liquefaction cools the gas to a temperature of about −160° C. at or near atmospheric pressure. Cooling is generally accomplished by heat exchange with one or more refrigerants such as propane, propylene, ethane, ethylene, and methane. Although many refrigeration cycles have been used to liquefy natural gas, the three types most commonly used in LNG plants today are: (1) "cascade cycle" which uses multiple single component refrigerants in heat exchangers arranged progressively to reduce the temperature of the gas to a liquefaction temperature, (2) "expander cycle" which expands gas from a high pressure to a low pressure with a corresponding reduction in temperature, and (3) "multi-component refrigeration cycle" which uses a multi-component refrigerant in specially designed exchangers. Most natural gas liquefaction cycles use variations or combinations of these three basic types.

In conventional LNG plants water, carbon dioxide, sulfur-containing compounds, such as hydrogen sulfide and other acid gases, n-pentane and heavier hydrocarbons, including benzene, must be substantially removed from the natural gas processing, down to parts-per-million (ppm) levels. Some of these compounds will freeze, causing plugging problems in the process equipment. Other compounds, such as those containing sulfur, are typically removed to meet sales specifications. In a conventional LNG plant, gas treating equipment is required to remove the carbon dioxide and acid gases. The gas treating equipment typically uses a chemical and/or physical solvent regenerative process and requires a significant capital investment. Also, the operating expenses are high. Dry bed dehydrators, such as molecular sieves, are required to remove the water vapor. A scrub column and fractionation equipment are used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapors in LNG containers at the point of delivery is undesirable.

There is a continuing need in the industry for an improved process for liquefying natural gas that contains $CO_2$ in concentrations that would freeze during the liquefaction process and at the same time having power requirements that are economic.

SUMMARY

The invention relates generally to a process for producing pressurized liquefied natural gas (PLNG) in which the natural gas feed stream contains a freezable component. The freezable component, although typically $CO_2$, $H_2S$ or another acid gas, can be any component that has the potential for forming solids in the separation system.

In the process of this invention, a multi-component feed stream containing methane and a freezable component having a relative volatility less than that of methane is introduced into a separation system having a freezing section operating at a pressure above about 1,380 kPa (200 psia) and under solids forming conditions for the freezable component and a distillation section positioned below the freezing section. The separation system, which contains a controlled freezing zone ("CFZ"), produces a vapor stream rich in methane and a liquid stream rich in the freezable component. At least a portion of the vapor stream is cooled to produce a liquefied stream rich in methane having a temperature above about −112° C. (−170° F.) and a pressure sufficient for the liquid product to be at or below its bubble point. A first portion of the liquefied stream is withdrawn from the process as a pressurized liquefied product stream (PLNG). A second portion of the liquefied stream is returned to the separation system to provide refrigeration duty to the separation system.

In one embodiment, a vapor stream is withdrawn from an upper region of the separation system and is compressed to a higher pressure and cooled. The cooled, compressed stream is then expanded by an expansion means to produce a predominantly liquid stream. A first portion of the liquid stream is fed as a reflux stream to the separation system, thereby providing open-loop refrigeration to the separation system, and a second portion of the liquid stream is withdrawn as a product stream having a temperature above about −112° C. (−170° F.) and a pressure sufficient for the liquid product to be at or below its bubble point.

In another embodiment, a vapor stream is withdrawn from an upper region of the separation system and cooled by a closed-loop refrigeration system to liquefy the methane-rich vapor stream to produce a liquid having a temperature above about −112° C. (−170° F.) and a pressure sufficient for the liquid product to be at or below its bubble point.

The method of the present invention can be used both for the initial liquefaction of a natural gas at the source of supply for storage or transportation, and to re-liquefy natural gas vapors given off during storage and ship loading. Accordingly, an object of this invention is to provide an improved, integrated liquefaction and $CO_2$ removal system for the liquefaction or reliquefaction of natural gas with high $CO_2$ concentrations (greater than about 5%). Another object of this invention is to provide an improved liquefaction system wherein substantially less compression power is required than in prior art systems. A still further object of the invention is to provide a more efficient liquefaction process by keeping the process temperature for the entire process above about −112° C., thereby enabling the process equipment to be made of less expensive materials than would be required in a conventional LNG process that have at least part of the process operating at temperatures down to about −160° C. The very low temperature refrigeration of conventional LNG process is very expensive compared to the relatively mild refrigeration needed in the production of PLNG in accordance with the practice of this invention.

BRIEF DESCRIPTION OF THE DRAWINGS

The present invention and its advantages will be better understood by referring to the following detailed description and the attached Figures which are schematic flow diagrams of representative embodiments of this invention.

The flow diagrams illustrated in the Figures present various embodiments of practicing the process of this invention. The Figures are not intended to exclude from the scope of the invention other embodiments that are the result of normal and expected modifications of these specific embodiments. Various required subsystems such as pumps, valves, flow stream mixers, control systems, and sensors have been deleted from the Figures for the purposes of simplicity and clarity of presentation.

DESCRIPTION OF THE PREFERRED EMBODIMENTS

The process of this invention distillatively separates in a separation system a multi-component feed stream containing methane and at least one freezable component having a relative volatility less than that of methane, wherein the separation system contains a controlled freezing zone ("CFZ"). The separation system produces an overhead vapor stream enriched with methane and a bottoms product enriched with the freezable component. At least part of the overhead vapor stream is then liquefied to produce liquefied natural gas product having a temperature above about −112° C. (−170° F.) and a pressure sufficient for the liquid product to be at or below its bubble point. This product is sometimes referred to herein as pressurized liquid natural gas ("PLNG"). Another portion of such liquefied overhead stream is returned to the separation system as a reflux stream.

The term "bubble point" is the temperature and pressure at which a liquid begins to convert to gas. For example, if a certain volume of PLNG is held at constant pressure, but its temperature is increased, the temperature at which bubbles of gas begin to form in the PLNG is the bubble point. Similarly, if a certain volume of PLNG is held at constant temperature but the pressure is reduced, the pressure at which gas begins to form defines the bubble point. At the bubble point, PLNG is saturated liquid. It is preferred that the PLNG is not just condensed to its bubble point, but further cooled to subcool the liquid. Subcooling the PLNG reduces the amount of boil-off vapors during its storage, transportation and handling.

Prior to this invention, it was well understood by those skilled in the art that CFZ could remove unwanted $CO_2$. It was not appreciated that the CFZ process could be integrated with a liquefaction process to produce PLNG.

The process of the present invention is more economic to use since the process requires less power for liquefying the natural gas than processes used in the past and the equipment used in the process of this invention can be made of less expensive materials. By contrast, prior art processes that produce LNG at atmospheric pressures having temperatures as low as −160° C. require process equipment made of expensive materials for safe operation.

In the practice of this invention, the energy needed for liquefying natural gas containing significant concentrations of a freezable component such as $CO_2$ is greatly reduced over energy requirements of a conventional process for producing LNG from such natural gas. The reduction in necessary refrigeration energy required for the process of the present invention results in a large reduction in capital costs, proportionately lower operating expenses, and increased efficiency and reliability, thus greatly enhancing the economics of producing liquefied natural gas.

At the operating pressures and temperatures of the present invention, about 3½ weight percent nickel can be used in piping and facilities in the coldest operating areas of the liquefaction process, whereas the more expensive 9 weight percent nickel or aluminum is generally required for the same equipment in a conventional LNG process. This provides another significant cost reduction for the process of this invention compared to prior art LNG processes.

The first consideration in cryogenic processing of natural gas is contamination. The raw natural gas feed stock suitable for the process of this invention may comprise natural gas obtained from a crude oil well (associated gas) or from a gas well (non-associated gas). The raw natural gas often contains water, carbon dioxide, hydrogen sulfide, nitrogen, butane, hydrocarbons of six or more carbon atoms, dirt, iron sulfide, wax, and crude oil. The solubilities of these contaminants vary with temperature, pressure, and composition.

At cryogenic temperatures, $CO_2$, water, and other contaminants can form solids, which can plug flow passages in cryogenic heat exchangers. These potential difficulties can be avoided by removing such contaminants if conditions within their pure component, solid phase temperature-pressure phase boundaries are anticipated. In the following description of the invention, it is assumed that the natural gas stream contains $CO_2$. If the natural gas stream contains heavy hydrocarbons which could freeze out during liquefaction, these heavy hydrocarbons will be removed with the $CO_2$.

One advantage of the present invention is that the warmer operating temperatures enables the natural gas to have higher concentration levels of freezable components than would be possible in a conventional LNG process. For example, in a conventional LNG plant that produces LNG at $-160°$ C., the $CO_2$ must be below about 50 ppm to avoid freezing problems. In contrast, by keeping the process temperatures above about $-112°$ C., the natural gas can contain $CO_2$ at levels as high as about 1.4 mole % $CO_2$ at temperatures of $-112°$ C. and about 4.2% at $-95°$ C. without causing freezing problems in the liquefaction process of this invention.

Additionally, moderate amounts of nitrogen in the natural gas need not be removed in the process of this invention because nitrogen will remain in the liquid phase with the liquefied hydrocarbons at the operating pressures and temperatures of the present invention. The ability to reduce, or in some cases omit, the equipment required for gas treating and nitrogen rejection provides significant technical and economic advantages. These and other advantages of the invention will be better understood by referring to the liquefaction process illustrated in the Figures.

Figure 1:
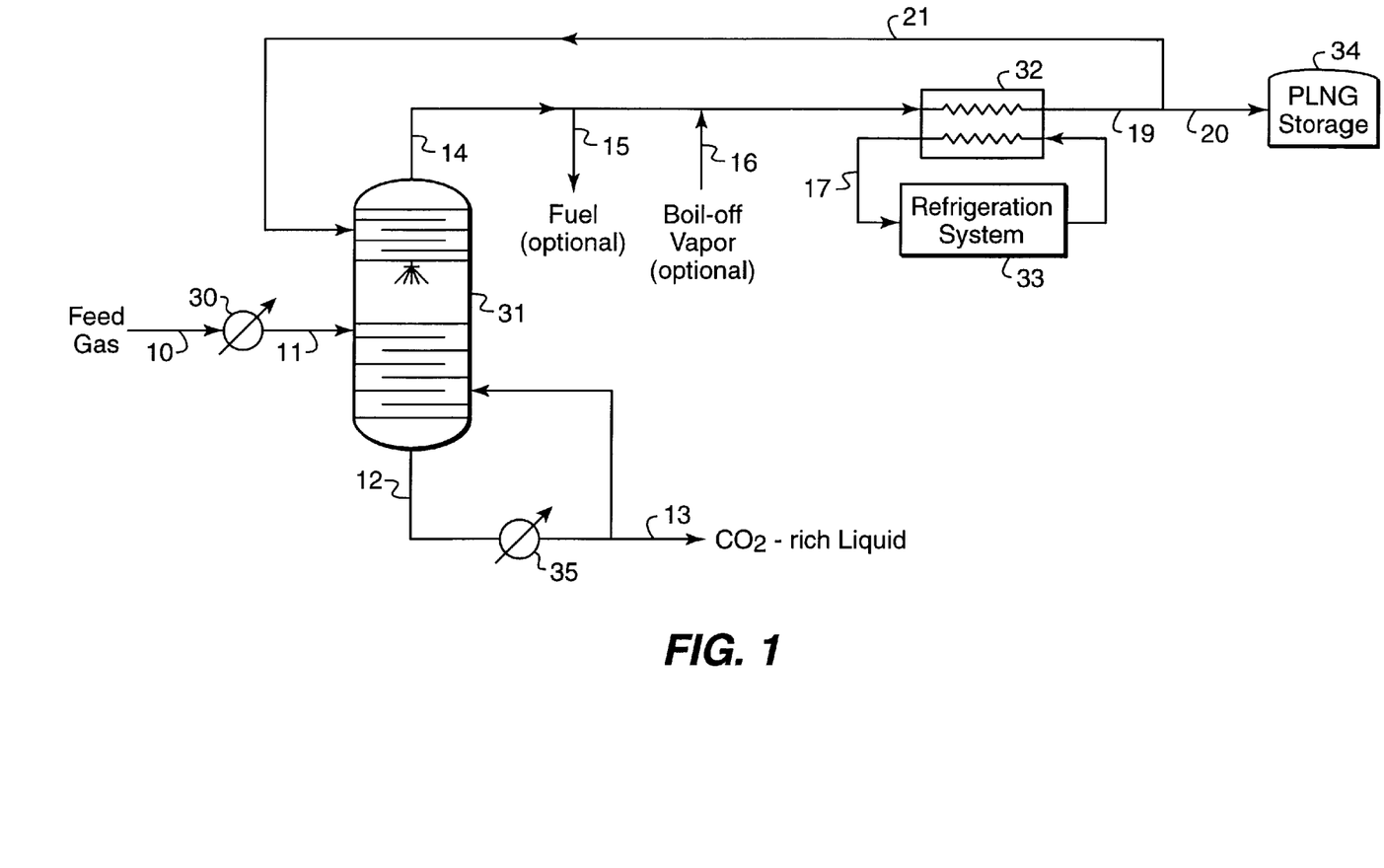
FIG. 1 is a schematic representation of a cryogenic, CFZ process generally illustrating a closed-loop refrigeration cycle for producing pressurized liquefied natural gas in accordance with the process of this invention.

Referring to FIG. 1, a natural gas feed stream 10 enters the system at a pressure above about 3,100 kPa (450 psia) and more preferably above about 4,800 kPa (700 psia) and temperatures preferably between about 0° C. and 40° C.; however, different pressures and temperatures can be used, if desired, and the system can be modified accordingly. If the gas stream 10 is below about 1,380 kPa (200 psia), it can be pressurized by a suitable compression means (not shown), which may comprise one or more compressors. In this description of the process of this invention, it is assumed that the natural gas stream 10 has been suitably treated to remove water using conventional and well known processes (not shown in FIG. 1) to produce a "dry" natural gas stream.

Feed stream 10 is passed through cooler 30. The cooler 30 may comprise one or more conventional heat exchangers that cool the natural gas stream to cryogenic temperatures, preferably down to about $-50°$ C. to $-70°$ C. and more preferably to temperatures just above the solidification temperature of $CO_2$. The cooler 30 may comprise one or more heat exchange systems cooled by conventional refrigeration systems, one or more expansion means such as Joule-Thomson valves or turboexpanders, one or more heat exchangers which use liquid from the lower section of the fractionation column 31 as coolant, one or more heat exchangers that use the bottoms product stream of column 31 as coolant, or any other suitable source of cooling. The preferred cooling system will depend on the availability of refrigeration cooling, space limitation, if any, and environmental and safety considerations. Those skilled in the art can select a suitable cooling system taking into account the operating circumstance of the liquefaction process.

The cooled stream 11 exiting the feed cooler 30 is conveyed into a fractionation column 31 having a controlled freeze zone ("CFZ"), which is a special section to handle solidification and melting of $CO_2$. The CFZ section, which handles solidification and melting of $CO_2$, does not contain packing or trays like conventional distillation columns, instead it contains one or more spray nozzles and a melting tray. Solid $CO_2$ forms in the vapor space in the distillation column and falls into the liquid on the melting tray. Substantially all of the solids that form are confined to the CFZ section. The distillation column 31 has a conventional distillation section below the CFZ section and preferably another distillation section above the CFZ section. Design and operation of a fractionation column 31 are known to those skilled in the art. Examples of CFZ designs are illustrated in U.S. Pat. Nos. 4,533,372; 4,923,493; 5,062,270; 5,120,338; and 5,265,428.

A $CO_2$-rich stream 12 exits the bottom of column 31. The liquid bottom product is heated in a reboiler 35 and a portion is returned to the lower section of column 31 as reboiled vapor. The remaining portion (stream 13) leaves the process as $CO_2$-rich product. A methane-rich stream 14 exits the top of column 31 and passes through a heat exchanger 32 which is cooled by stream 17 that is connected to a conventional closed-loop refrigeration system 33. A single, multi-component, or cascade refrigeration system may be used. A cascade refrigeration system would comprise at least two closed-loop refrigeration cycles. The closed-loop refrigeration system may use as refrigerants methane, ethane, propane, butane, pentane, carbon dioxide, hydrogen sulfide, and nitrogen. Preferably, the closed-loop refrigeration system uses propane as the predominant refrigerant. Although FIG. 1 shows only one heat exchanger 32, in the practice of this invention multiple heat exchangers may be used to cool the vapor stream 14 in multiple stages. Heat exchanger 32 preferably condenses substantially all of vapor stream 14 to a liquid. Stream 19 exiting the heat exchanger has a temperature above about $-112°$ C. and a pressure sufficient for the liquid product to be at or below its bubble point. A first portion of the liquid stream 19 is passed as stream 20 to a suitable storage means 34 such as a stationary storage tank or a carrier such as a PLNG ship, truck, or railcar for containing the PLNG at a temperature above about $-112°$ C. and a pressure sufficient for the liquid product to be at or below its bubble point. A second portion of the liquid stream 19 is returned as stream 21 to the separation column 31 to provide refrigeration to the separation column 31. The relative proportions of streams 20 and 21 will depend on the composition of the feed gas 10, operating conditions of the separation column 31, and desired product specifications.

In the storage, transportation, and handling of liquefied natural gas, there can be a considerable amount of "boil-off," the vapors resulting from evaporation of liquefied natural gas. The process of this invention can optionally re-liquefy boil-off vapor that is rich in methane. Referring to FIG. 1, boil-off vapor stream 16 may optionally be introduced to vapor stream 14 prior to cooling by heat exchanger 32. The boil-off vapor stream 16 should be at or near the pressure of the vapor stream 14 to which the boil-off vapor is introduced. Depending on the pressure of the boil-off vapor, the boil-off vapor may need to be pressure adjusted by one or more compressors or expanders (not shown in the Figures) to match the pressure at the point the boil-off vapor enters the liquefaction process.

A minor portion of the vapor stream 14 may optionally be removed from the process as fuel (stream 15) to supply a portion of the power needed to drive compressors and pumps in the liquefaction process. This fuel may optionally be used as a refrigeration source to assist in cooling the feed stream 10.

Figure 2:
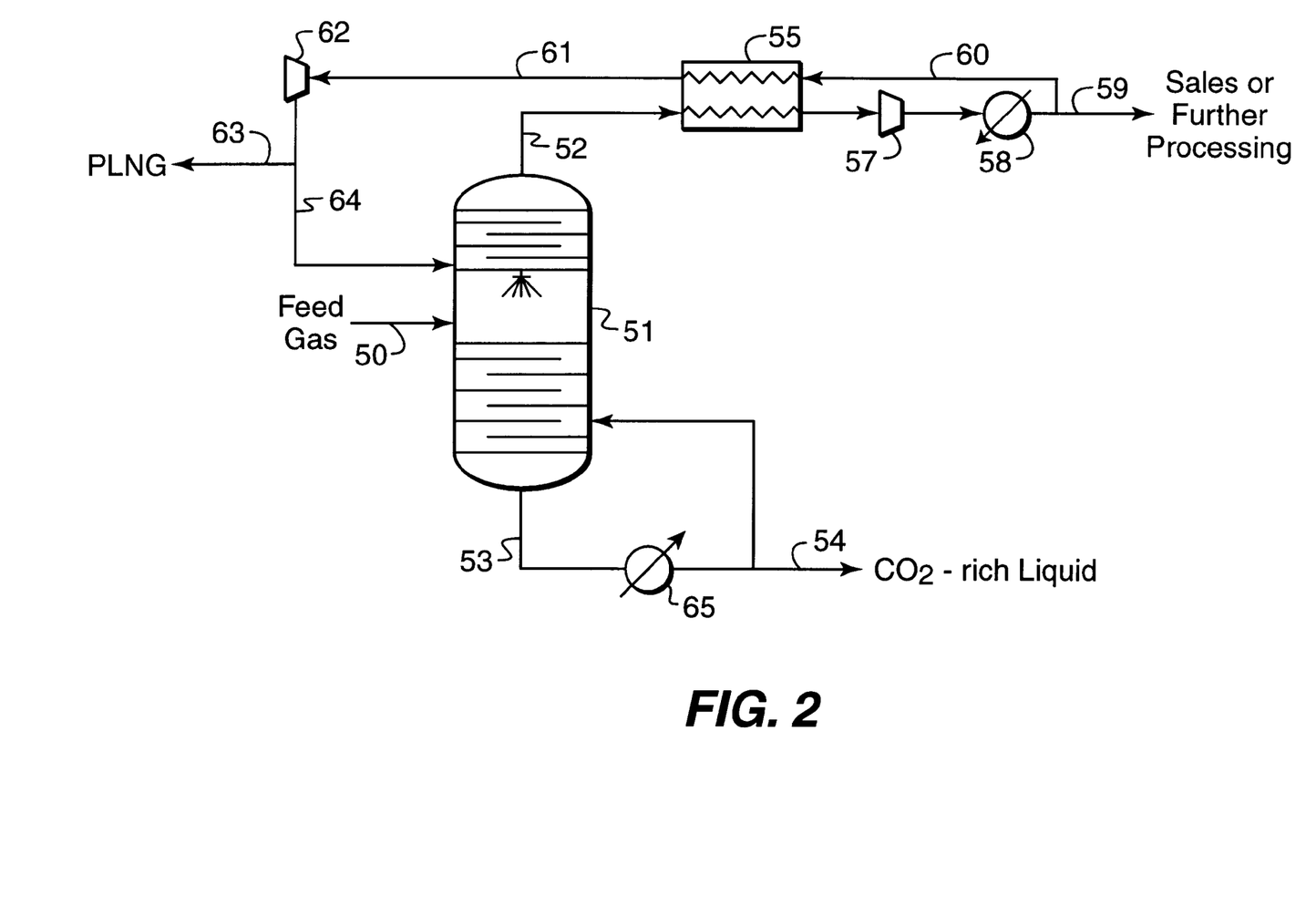
FIG. 2 is a schematic representation of a cryogenic, CFZ process generally illustrating an open-loop refrigeration cycle for producing pressurized liquefied natural gas in accordance with the process of this invention.

FIG. 2 illustrates in schematic form another embodiment of this invention in which open-loop refrigeration is used to provide refrigeration to the separation column 51 and to produce PLNG. Referring to FIG. 2, a multi-component gas stream 50 containing methane and carbon dioxide that has been dehydrated and cooled by any suitable source of cooling (not shown in FIG. 2) is fed into a CFZ column 51 which has essentially the same design as separation column 31 of FIG. 1. This embodiment effectively manages the potential for the formation of solids in the liquefaction process by feeding stream 64 directly into CFZ column 51.

The temperature of the gas fed into CFZ column 51 is preferably above the $CO_2$ solidification temperature. A methane-enriched vapor stream 52 exits the overhead of CFZ column 51 and a carbon dioxide-enriched stream 53 exits the bottom of CFZ column 51. The liquid bottom product is heated in a reboiler 65 and a portion is returned to the lower section of the CFZ column 51 as reboiled vapor. The remaining portion (stream 54) leaves the process as $CO_2$-rich liquid product.

A first portion of the overhead stream 52 is refluxed back to the CFZ column 51 as stream 64 to provide open-loop refrigeration to the CFZ column 51. A second portion of the overhead stream 52 is withdrawn (stream 63) as a PLNG product stream at a pressure that is at or near the operating pressure of the CFZ column 51 and at a temperature above about −112° C. (−170° F.). A third portion of the overhead stream 52 may optionally be withdrawn (stream 59) for use as sales gas or further processed.

The principal components of open-loop refrigeration in this embodiment comprise compressing by one or more compressors 57 the overhead stream 52 exiting the top of the CFZ column 51, cooling the compressed gas by one or more coolers 58, passing at least part of the cooled gas (stream 61) to one or more expansion means 62 to decrease the pressure of the gas stream and to cool it, and feeding a portion (stream 64) of the cooled, expanded stream to the CFZ column 51. Refluxing part of the overhead stream 52 by this process provides open-loop refrigeration to CFZ column 51. Stream 60 is preferably cooled by heat exchanger 55 which also warms the overhead stream 52. The pressure of stream 64 is preferably controlled by regulating the amount of compression produced by compressor 57 to ensure that the fluid pressures of streams 60, 61, and 64 are high enough to prevent formation of solids. Returning at least part of the overhead vapor stream 52 to the upper portion of column 51 as liquid, condensed by open-loop refrigeration, also provides reflux to column 51.

CFZ column 51 has a conventional distillation section below the CFZ section and potentially another distillation section above the CFZ section. The CFZ section handles any formation and melting of $CO_2$ solids. During start-up, all of stream 64 may be diverted directly to the CFZ section. As stream 64 becomes leaner in the solids formers, more of stream 64 can be fed to the distillation section of the column above the CFZ section.

Figure 3:
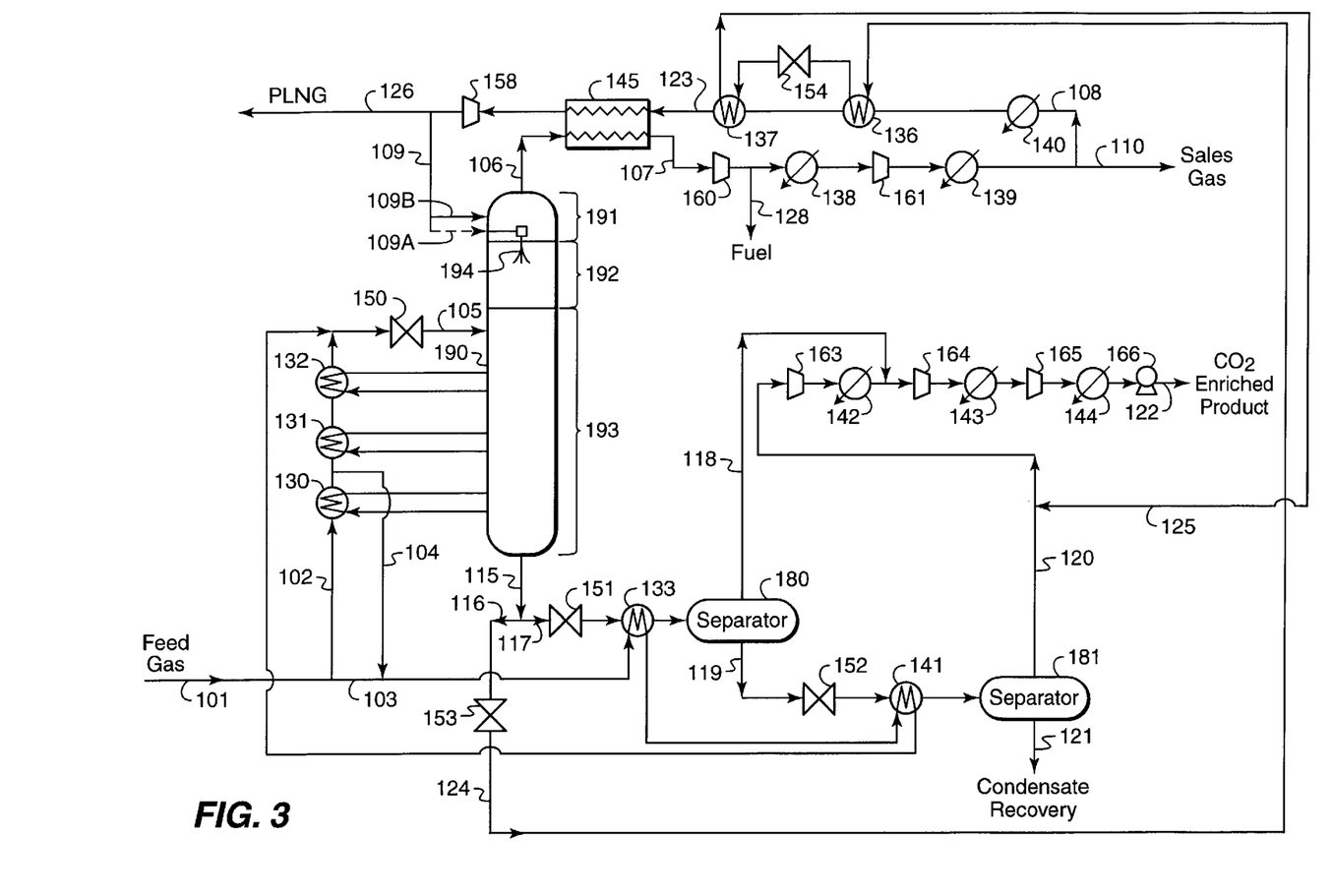
FIG. 3 is a schematic representation of still another embodiment of the present invention in which carbon dioxide and methane are distillatively separated in a distillation column having a CFZ in which one overhead product stream is pressurized liquefied natural gas and another overhead product stream is product sales gas.

FIG. 3 illustrates in schematic form another embodiment of this invention in which the process of this invention produces both PLNG and sales gas as product streams. In this embodiment, the overhead product streams are 50% PLNG (stream 126) and 50% sales gas (stream 110). However, additional PLNG, up to 100%, can be produced by providing additional cooling from either heat exchange with colder fluids or additional pressure drop at the expander through the installation of additional compression and after-coolers. Likewise, less PLNG can be produced by providing less cooling.

Referring to FIG. 3, it is assumed that natural gas feed stream 101 contains over 5 mole % $CO_2$ and is virtually free of water to prevent freeze-ups and hydrate formation from occurring in the process. After dehydration, the feed stream is cooled, depressurized, and fed to distillation column 190 operating at a pressure in the range of from about 1,379 kPa (200 psia) to about 4,482 kPa (650 psia). The distillation column 190, which has a CFZ section similar to separation column 31 of FIG. 1, separates the feed into a methane-enriched vapor overhead product and a carbon dioxide-enriched liquid bottoms product. In the practice of this invention, distillation column 190 has at least two, and preferably three, distinct sections: a distillation section 193, a controlled freeze zone (CFZ) 192 above the distillation section 193, and optionally an upper distillation section 191.

In this example, the tower feed is introduced into the upper part of the distillation section 193 through stream 105 where it undergoes typical distillation. The distillation sections 191 and 193 contain trays and/or packing and provide the necessary contact between liquids falling downward and vapors rising upward. The lighter vapors leave distillation section 193 and enter the controlled freezing zone 192. Once in the controlled freezing zone 192, the vapors contact liquid (sprayed freezing zone liquid reflux) emanating from nozzles or spray jet assemblies 194. The vapors then continue up through the upper distillation section 191. For effective separation of $CO_2$ from the natural gas stream in column 190, refrigeration is required to provide liquid traffic in the upper sections of the column 190. In the practice of this embodiment, the refrigeration to the upper portion of column 190 is supplied by open-loop refrigeration.

In the embodiment of FIG. 3, the incoming feed gas is divided into two streams: stream 102 and stream 103. Stream 102 is cooled in one or more heat exchangers. In this example, three heat exchangers 130, 131, 132 are used to cool stream 102 and to serve as reboilers to provide heat to the distillation section 193 of column 190. Stream 103 is cooled by one or more heat exchangers that are in heat exchange with one of the bottom product streams of column 190. FIG. 3 shows two heat exchangers 133 and 141 which warm bottoms products leaving the column 190. However, the number of heat exchangers for providing the feed stream cooling services will depend on a number of factors including, but not limited to, inlet gas flow rate, inlet gas composition, feed temperature, and heat exchange requirements. Optionally, although not shown in FIG. 3, feed stream 101 may be cooled by a process stream exiting the top of column 190. As another option, the feed stream 101 may be cooled at least partially by conventional refrigeration systems, such as closed-loop single component or multi-component refrigeration systems.

Streams 102 and 103 are recombined and the combined stream is passed through an appropriate expansion means, such as Joule-Thomson valve 150, to approximately the operating pressure of the separation column 190. Alternatively, a turboexpander can be used in place of the Joule-Thomson valve 150. The flash expansion through valve 150 produces a cold-expanded stream 105 which is directed to the upper part of the distillation section 193 at a point where the temperature is preferably high enough to avoid freezing of $CO_2$.

Overhead vapor stream 106 from the separation column 190 passes through heat exchanger 145 which warms vapor stream 106. The warmed vapor stream (stream 107) is recompressed by single-stage compression or a multi-stage compressor train. In this example, stream 107 passes successively through two conventional compressors 160 and 161. After each compression step, stream 107 is cooled by after-coolers 138 and 139, preferably using ambient air or water as the cooling medium. The compression and cooling of stream 107 produces a gas which can be used for sale to a natural gas pipeline or further processing. The compression of vapor stream 107 will usually be to at least a pressure that meets pipeline requirements.

A portion of stream 107 after passing through compressor 160 may optionally be withdrawn (stream 128) for use as fuel for the gas processing plant. Another portion of stream 107 after passing through after-cooler 139 is withdrawn (stream 110) as sales gas. The remaining part of stream 107 is passed as stream 108 to heat exchangers 140, 136 and 137. Stream 108 is cooled in heat exchangers 136 and 137 with cold fluids from stream 124 exiting the bottom of column 190. Stream 108 is then cooled further in heat exchanger 145 by heat exchange with overhead vapor stream 106, resulting in warming of stream 106. Stream 108 is then pressure expanded by an appropriate expansion device, such as expander 158 to approximately the operating pressure of column 190. Stream 108 then splits, one portion is passed as PLNG product (stream 126) at a temperature above about −112° C. and a pressure above about 1,380 kPa (200 psia) for storage or transportation. The other portion (stream 109) enters separation column 190. The discharge pressure of compressor 161 is regulated to produce a pressure that is high enough so that the pressure drop across the expander 158 provides sufficient cooling to ensure that streams 109 and 126 are predominantly liquid enriched in methane. In order to produce additional PLNG (stream 126), additional compression can be installed after compressor 160 and before heat exchanger 136. To start up the process, stream 109 is preferably fed through stream 109A and sprayed directly into the CFZ section 192 through spray nozzle 194. After process start up, stream 109 may be fed (stream 109B) to the upper section 191 of the separation column 190.

A $CO_2$-enriched liquid product stream 115 exits the bottom of column 190. Stream 115 is divided into two portions, stream 116 and stream 117. Stream 116 passes through an appropriate expansion device, such as Joule-Thomson valve 153, to a lower pressure. Stream 124 that exits valve 153 is then warmed in heat exchanger 136 and stream 124 passes through another Joule-Thomson valve 154 and still another heat exchanger 137. The resulting stream 125 is then merged with vapor stream 120 from separator 181.

Stream 117 is expanded by an appropriate expansion device such as expansion valve 151 and passed through heat exchanger 133 thereby cooling feed stream 103. Stream 117 is then directed to separator 180, a conventional gas-liquid separation device. Vapor from separator 180 (stream 118) passes through one or more compressors and high pressure pumps to boost the pressure. FIG. 3 shows a series of two compressors 164 and 165 and pump 166 with conventional coolers 143 and 144. Product stream 122 leaving pump 166 in the series has a pressure and temperature suitable for injection into a subterranean formation. Liquid products exiting separator 180 through stream 119 are passed through an expansion device such as expansion valve 152 and then passed through heat exchanger 141 which is in heat exchange relationship with feed stream 103, thereby further cooling feed stream 103. Stream 119 is then directed to separator 181, a conventional gas-liquid separator device. Vapors from separator 181 are passed (stream 120) to a compressor 163 followed by a conventional after-cooler 142. Stream 120 is then merged with stream 118. Any condensate available in stream 121 may be recovered by conventional flash or stabilization processes, and then may be sold, incinerated, or used for fuel.

Although the separation systems illustrated in FIGS. 1–3 have only one distillation column (column 31 of FIG. 1, column 51 of FIG. 2, and column 190 of FIG. 3), the separation systems of this invention can comprise two or more distillation columns. For example, to reduce the height of column 190 of FIG. 3, it may be desirable to split column 190 into two or more columns (not shown in the figures). The first column contains two sections, a distillation section and a controlled freeze zone above the distillation section, and the second column contains one distillation section, which performs the same function as section 191 in FIG. 3. A multi-component feed stream is fed to the first distillation column. The liquid bottoms of the second column is fed to the freezing zone of the first column. The vapor overhead of the first column is fed to the lower region of the second column. The second column has the same open-loop refrigeration cycle as that shown in FIG. 3 for column 190. A vapor stream from the second distillation column is withdrawn, cooled, and a portion thereof refluxed to the upper region of the second separation column.

EXAMPLES

Simulated mass and energy balances were carried out to illustrate the embodiments shown in FIG. 1 and FIG. 3, and the results are shown in Tables 1 and 2 below, respectively. For the data presented in Table 1, it was assumed that the overhead product stream was 100% PLNG (stream 20 of FIG. 1) and the refrigeration system was a cascaded propane-ethylene system. For the data presented in Table 2, it was assumed that the overhead product streams were 50% PLNG (stream 126 of FIG. 3) and 50% sales gas (stream 110 of FIG. 3).

The data were obtained using a commercially available process simulation program called HYSYS™ (available from Hyprotech Ltd. of Calgary, Canada); however, other commercially available process simulation programs can be used to develop the data, including for example HYSIM™, PROII™, and ASPEN PLUS™, which are familiar to those of ordinary skill in the art. The data presented in the Tables are offered to provide a better understanding of the embodiments shown in FIGS. 1 and 3, but the invention is not to be construed as unnecessarily limited thereto. The temperatures and flow rates are not to be considered as limitations upon the invention which can have many variations in temperatures and flow rates in view of the teachings herein.

An additional process simulation was done using the basic flow scheme shown in FIG. 1 (using the same feed stream composition and temperature as used to obtain the data in Table 1) to produce conventional LNG at near atmospheric pressure and a temperature of −161° C. (−258° F.). The CFZ/conventional LNG process requires significantly more refrigeration than the CFZIPLNG process depicted in FIG. 1. To obtain the refrigeration required to produce LNG at a temperature of −161° C., the refrigeration system must be expanded from a propane/ethylene cascade system to a propane/ethylene/methane cascade system. Additionally, stream 20 would need to be further cooled using the methane and the product pressure would need to be dropped using a liquid expander or Joule-Thomson valve to produce a LNG product at or near atmospheric pressure. Because of the lower temperatures, the $CO_2$ in the LNG must be removed to about 50 ppm to avoid operational problems associated with freezing of $CO_2$ in the process instead of 2% $CO_2$ as in the CFZ/PLNG process depicted in FIG. 1.

Table 3 shows a comparison of the refrigerant compression requirements for the conventional LNG process and the PLNG process described in simulation example of the foregoing paragraph. As shown in Table 3, the total required refrigerant compression power was 67% higher to produce conventional LNG than to produce PLNG in accordance with the practice of this invention.

A person skilled in the art, particularly one having the benefit of the teachings of this patent, will recognize many modifications and variations to the specific processes disclosed above. For example, a variety of temperatures and pressures may be used in accordance with the invention, depending on the overall design of the system and the composition of the feed gas. Also, the feed gas cooling train may be supplemented or reconfigured depending on the overall design requirements to achieve optimum and efficient heat exchange requirements. Additionally, certain process steps may be accomplished by adding devices that are interchangeable with the devices shown. For example, separating and cooling may be accomplished in a single device. As discussed above, the specifically disclosed embodiments and examples should not be used to limit or restrict the scope of the invention, which is to be determined by the claims below and their equivalents.

TABLE 1

Integrated CFZ/PLNG

| Steam | Phase Vapor/Liquid | Pressure kPa | psia | Temperature °C. | °F. | Total Flow kg-moles/hr | lb-moles/hr | Mole % CO$_2$ | CH$_4$ |
|---|---|---|---|---|---|---|---|---|---|
| 10 | Vapor | 6,764 | 981 | 18.3 | 65.0 | 49,805 | 109,800 | 71.1 | 26.6 |
| 11 | Vapor/Liquid | 3,103 | 450 | −56.7 | −70.0 | 49,805 | 109,806 | 71.1 | 26.6 |
| 12 | Liquid | 3,103 | 450 | −7.7 | 18.2 | 55,656 | 122,700 | 95.9 | 1.4 |
| 13 | Liquid | 3,103 | 450 | −4.9 | 23.2 | 36,424 | 80,300 | 96.5 | 0.5 |
| 14 | Vapor | 3,068 | 445 | −92.0 | −133.6 | 30,844 | 68,000 | 2.0 | 97.7 |
| 19 | Liquid | 3,068 | 445 | −94.6 | −138.3 | 30,844 | 68,000 | 2.0 | 97.7 |
| 20 | Liquid | 3,068 | 445 | −94.6 | −138.3 | 13,381 | 29,500 | 2.0 | 97.7 |
| 21 | Liquid | 3,068 | 445 | −94.6 | −138.3 | 17,463 | 38,500 | 2.0 | 97.7 |

TABLE 2

Integrated CFZ/PLNG with open-loop refrigeration

| Steam | Phase Vapor/Liquid | Pressure kPa | psia | Temperature °C. | °F. | Total Flow kg-moles/hr | lb-moles/hr | Mole % CO$_2$ | N$_2$ | CH$_4$ | H$_2$S | C$_2$+ |
|---|---|---|---|---|---|---|---|---|---|---|---|---|
| 101 | Vapor | 6,764 | 981 | 18.3 | 65 | 49,850 | 109,900 | 71.1 | 0.4 | 26.6 | 0.6 | 1.3 |
| 102 | Vapor | 6,764 | 981 | 18.3 | 65 | 19,731 | 43,500 | 71.1 | 0.4 | 26.6 | 0.6 | 1.3 |
| 103 | Vapor | 6,764 | 981 | 18.3 | 65 | 30,119 | 66,400 | 71.1 | 0.4 | 26.6 | 0.6 | 1.3 |
| 104 | Vapor/Liquid | 6,695 | 971 | −7.8 | 18 | 5,942 | 13,100 | 71.1 | 0.4 | 26.6 | 0.6 | 1.3 |
| 105 | Vapor/Liquid | 2,758 | 400 | −56.7 | −70 | 49,850 | 109,900 | 71.1 | 0.4 | 26.6 | 0.6 | 1.3 |
| 106 | Vapor | 2,758 | 400 | −99.4 | −147 | 31,116 | 68,600 | 0.1 | 1.5 | 98.4 | 16 ppm | 0.0 |
| 107 | Vapor | 2,551 | 370 | −30.6 | −23 | 31,116 | 68,600 | 0.1 | 1.5 | 98.4 | 16 ppm | 0.0 |
| 108 | Vapor | 16,823 | 2,440 | 51.7 | 125 | 52,300 | | 0.1 | 1.5 | 98.4 | 16 ppm | 0.0 |
| 109 | Liquid | 2,758 | 400 | −101.7 | −151 | 18,008 | 39,700 | 0.1 | 1.5 | 98.4 | 16 ppm | 0.0 |
| 110 | Vapor | 16,823 | 2,440 | 51.7 | 125 | 5,715 | 12,600 | 0.1 | 1.5 | 98.4 | 16 ppm | 0.0 |
| 115 | Liquid | 2,758 | 400 | −11.1 | 12 | 36,741 | 81,000 | 96.5 | 0.0 | 1.0 | 0.7 | 1.8 |
| 116 | Liquid | 2,758 | 400 | −11.1 | 12 | 6,532 | 14,400 | 96.5 | 0.0 | 1.0 | 0.7 | 1.8 |
| 117 | Liquid | 2,758 | 400 | −11.1 | 12 | 30,209 | 66,600 | 96.5 | 0.0 | 1.0 | 0.7 | 1.8 |
| 118 | Vapor | 1,862 | 270 | −21.1 | −6 | 21,727 | 47,900 | 96.8 | 0.0 | 1.3 | 0.7 | 1.2 |
| 119 | Liquid | 1,862 | 270 | −21.1 | −6 | 8,482 | 18,700 | 95.5 | 0.0 | 0.1 | 0.9 | 3.5 |
| 120 | Vapor | 621 | 90 | −23.3 | −10 | 8,210 | 18,100 | 97.8 | 0.0 | 0.1 | 0.9 | 1.2 |
| 121 | Liquid | 621 | 90 | −23.3 | −10 | 227 | 500 | 18.7 | 0.0 | 0.0 | 0.6 | 80.7 |
| 122 | Liquid | 29,751 | 4,315 | 65.6 | 150 | 36,514 | 80,500 | 97.0 | 0.0 | 1.0 | 0.7 | 1.3 |
| 123 | Vapor | 16,616 | 2,410 | −28.3 | −19 | 23,723 | 52,300 | 0.1 | 1.5 | 98.4 | 16 ppm | 0.0 |
| 124 | Vapor/Liquid | 1,931 | 280 | −22.2 | −8 | 6,532 | 14,400 | 96.5 | 0.0 | 1.0 | 0.7 | 1.8 |
| 125 | Vapor | 621 | 90 | −22.2 | −8 | 6,532 | 14,400 | 96.5 | 0.0 | 1.0 | 0.7 | 1.8 |
| 126 | Liquid | 2,758 | 400 | −101.7 | −151 | 5,715 | 12,600 | 0.1 | 1.5 | 98.4 | 16 ppm | 0.0 |
| 128 | Vapor | 6,895 | 1,000 | 56.1 | 133 | 1,633 | 3,600 | 0.1 | 1.5 | 98.4 | 16 ppm | 0.0 |

TABLE 3

Comparison of CFZ/Conventional LNG to CFZ/PLNG Refrigerant Compression Power Requirements

| | POWER, horsepower | | | POWER, kW | | |
|---|---|---|---|---|---|---|
| | CFZ/ Conventional | CFZ/PLNG | Difference | CFZ/ Conventional | CFZ/PLNG | Difference |
| Compressors | | | | | | |
| Propane Refrigerant Compressors | 162,220 | 115,960 | 46,250 | 120,962 | 86,473 | 34,489 |
| Ethylene Refrigerant Compressors | 86,090 | 41,490 | 44,600 | 64,198 | 30,940 | 33,259 |
| Methane Refrigerant Compressors | 14,031 | 0 | 14,031 | 10,463 | 0 | 10,463 |
| Total Installed Refrigerant Compression % of CFZ/PLNG | 262,331 | 157,450 | 104,881 | 195,623 | 117,412 | 78,221 |
| Total Installed | 167% | 100% | 67% | 167% | 100% | 67% |

What is claimed is:

1. A process for producing pressurized liquid rich in methane from a multi-component feed stream containing methane and a freezable component having a relative volatility less than that of methane, comprising:
   (a) introducing the multi-component feed stream into a separation system having a freezing section operating at a pressure above about 1,380 kPa (200 psia) and under solids forming conditions for the freezable component and a distillation section positioned below the freezing section, said separation system producing a vapor stream rich in methane and a liquid stream rich in the freezable component;
   (b) cooling at least a portion of said vapor stream to produce a liquefied stream rich in methane having a temperature above about $-112°$ C. ($-170°$ F.) and a pressure sufficient for the liquid product to be at or below its bubble point;
   (c) withdrawing a first portion of the liquefied stream of step (b) as a liquefied product stream rich in methane; and
   (d) introducing a second portion of the liquefied stream of step (b) to said separation system to provide refrigeration to said separation system.

2. The process of claim 1 further comprising introducing the liquefied product stream to a storage means for storage at a temperature above $-112°$ C. ($-170°$ F.).

3. The process of claim 1 wherein the cooling step (b) further comprises the steps of compressing said vapor stream to a high pressure stream, cooling at least a portion of said compressed stream in a heat exchanger, and expanding the cooled, compressed stream to a lower pressure whereby the compressed stream is further cooled to produce a liquefied stream rich in methane having a temperature above about $-112°$ C. ($-170°$ F.) and a pressure sufficient for the liquid product to be at or below its bubble point.

4. The process of claim 3 wherein the cooling of the compressed stream in the heat exchanger is by indirect heat exchange with the vapor stream of step (a).

5. The process of claim 3 further comprises cooling the liquid stream produced by said separation system by pressure expansion and using the expanded, cooled liquid stream to cool by indirect heat exchange the compressed stream.

6. The process of claim 3 further comprises regulating the pressure of the compressed stream and the pressure of the expanded stream to prevent formation of solids in the second portion of the liquefied stream introduced to the separation system.

7. The process of claim 1 wherein said separation system of step (a) comprises a first distillation column and a second distillation column, said first distillation column comprising a distillation section and a freezing zone above the distillation section, said second distillation column comprising a distillation section, further comprising the steps of introducing said multi-component feed stream of step (a) into said first distillation column, feeding a vapor overhead stream from said freezing zone to a lower region of the second distillation column, withdrawing a vapor stream from the second distillation column and cooling said vapor stream in accordance with step (b), feeding the second portion of the liquefied stream of step (d) to the upper region of said second separation column, withdrawing a liquid bottom stream from said second distillation column, and feeding the liquid bottom stream to said freezing zone of said first distillation column.

8. The process of claim 1 in which the separation system comprises a first distillation section, a second distillation section below the first distillation section, and a freezing zone between the first and the second distillation sections, wherein the second portion of the liquefied stream of step (d) is introduced to the first distillation section.

9. The process of claim 1 wherein the cooling of said vapor stream in step (b) is effected in a heat exchanger cooled by a closed-loop refrigeration system.

10. The process of claim 9 wherein the closed-loop refrigeration system has propane as the predominant refrigerant.

11. The process of claim 9 wherein the closed-loop refrigeration system has a refrigerant comprising methane, ethane, propane, butane, pentane, carbon dioxide, hydrogen sulfide, and nitrogen.

12. The process of claim 1 further comprises, prior to step (b), passing to said process boil-off gas resulting from evaporation of liquefied gas rich in methane.

13. The process of claim 1 wherein the liquefaction of the gas stream is performed using two closed-loop refrigeration cycles in cascade arrangement.

14. The process of claim 1 wherein the multi-component gas stream of step (b) has a pressure above 3,100 kPa (450 psia).

15. The process of claim 1 wherein the freezable component is carbon dioxide.

16. The process of claim 1 wherein the cooling step (b) further comprises the steps of compressing said vapor stream to a compressed stream, cooling at least a portion of said compressed stream in a heat exchanger, withdrawing a first portion of the cooled compressed stream as a product gas stream, and expanding a second portion of the cooled compressed stream to a lower pressure whereby the compressed stream is further cooled to produce a liquefied stream rich in methane having a temperature above about $-112°$ C. ($-170°$ F.) and a pressure sufficient for the liquid product to be at or below its bubble point.

17. A process for separating a multi-component feed stream comprising at least methane and at least one freezable component having a relative volatility less than that of methane to produce a liquid product enriched in methane, comprising:
   (a) introducing the multi-component feed stream into a separation system, said separation system operating under solids forming conditions for said freezable component;
   (b) withdrawing a vapor stream from an upper region of said separation system;
   (c) compressing said vapor stream to a higher pressure stream;
   (d) cooling at least a portion of said compressed stream using the cooling available in vapor stream of step (b);
   (e) expanding said cooled compressed stream to further cool said compressed stream, said expanded stream being predominantly liquid;
   (f) feeding at least a portion of said expanded stream to an upper region of the separation system to provide refrigeration to said separation system; and
   (g) recovering from the expanded stream a liquid product stream enriched in methane.

18. The process of claim 17 further comprises recovering a portion of said compressed vapor stream of step (c) and cooling the remaining portion of said vapor stream in accordance with step (d).

19. The process of claim 17 wherein said vapor stream of step (b) is warmed prior to compression in step (c).

20. The process of claim 17 in which the separation system comprises a first distillation section, a second distillation section below the first distillation section, and a freezing zone between the first and second distillation sections, wherein the expanded liquid stream is introduced into the first distillation section.

21. The process of claim 20 wherein said multi-component feed stream is introduced below the first distillation section.

22. The process of claim 17 further comprising removing liquid from the separation system, cooling said liquid by a pressure expansion means, and at least partially vaporizing said liquid by heat exchange with the compressed stream of step (c).

23. The process of claim 17 further comprising removing liquid from the separation system enriched with said freezable component, cooling said freezable component-enriched liquid by a pressure expansion means, and cooling the multi-component feed stream before it enters the separation system by heat exchange with said expanded, freezable component-enriched liquid.

24. The process of claim 17 further comprising cooling the multi-component stream by an expansion means before it enter the separation system.

25. The process of claim 17 wherein the pressure of the higher pressure stream of step (c) and the pressure of the expanded stream (e) are controlled to prevent solids formation in the stream fed to the separation system in step (f).

26. The process of claim 17 wherein the recovered liquid product stream of step (g) has a pressure above about 1,380 kPa (200 psia).

27. A process for producing liquefied natural gas at a pressure above about 1,380 kPa (200 psia) from a multi-component feed stream containing methane and a freezable component having a relative volatility less than that of methane, comprising:

(a) introducing the multi-component feed stream into a separation system, said separation system operating under solids forming conditions for said freezable component;

(b) withdrawing a vapor stream from an upper region of said separation system;

(c) compressing said vapor stream to a higher pressure stream;

(d) cooling at least a portion of said compressed stream using the cooling available in vapor stream of step (b);

(e) expanding said cooled compressed stream to further cool said compressed stream, said expanded stream being predominantly liquid at a pressure above about 1,380 kPa (200 psia);

(f) feeding at least a portion of said expanded stream to an upper portion of the separation system to provide refrigeration to said separation system; and (g) recovering from the expanded stream a liquid product stream enriched in methane at a pressure above about 1,380 kPa (200 psia).

28. A process for liquefying a multi-component stream comprising methane and at least one freezable component to produce a methane-rich liquid having a temperature above about −112° C. and a pressure sufficient for the liquid to be at or below its bubble point, comprising the steps of:

(a) introducing the multi-component feed stream having a pressure above about 1,380 kPa (200 psia) into a separation system operating under solids forming conditions for said freezable component to provide a methane-rich vapor stream and a liquid stream rich in said component that solidified in the separation system;

(b) liquefying the vapor stream by a closed loop refrigeration system to produce a methane-rich liquid having a temperature above about −112° C. and a pressure sufficient for the liquid to be at or below its bubble point; and (c) introducing said methane-rich liquid to a storage vessel for storage at a temperature above −112° C.

29. The process of claim 28 wherein the liquefaction of the feed stream is performed with a closed-loop refrigeration system.

30. The process of claim 28 wherein prior to liquefaction of the feed stream further comprises combining with the vapor stream from the separation system a boil-off gas resulting from evaporation of liquefied natural gas.

* * * * *